(12) United States Patent
Perazzolo et al.

(10) Patent No.: US 9,604,714 B2
(45) Date of Patent: Mar. 28, 2017

(54) AIRCRAFT INTERIOR TRIM PANEL, AND AIRCRAFT FITTED WITH SUCH PANELS

(71) Applicant: AGUSTAWESTLAND S.p.A., Samarate (IT)

(72) Inventors: Alessandro Perazzolo, Samarate (IT); Sara Scaini, Samarate (IT)

(73) Assignee: AGUSTAWESTLAND S.P.A., Samarte (IT)

( * ) Notice: Subject to any disclaimer, the term of this patent is extended or adjusted under 35 U.S.C. 154(b) by 370 days.

(21) Appl. No.: 14/366,451

(22) PCT Filed: Oct. 11, 2012

(86) PCT No.: PCT/IB2012/055523
§ 371 (c)(1),
(2) Date: Jun. 18, 2014

(87) PCT Pub. No.: WO2013/098665
PCT Pub. Date: Jul. 4, 2013

(65) Prior Publication Data
US 2015/0008281 A1    Jan. 8, 2015

(30) Foreign Application Priority Data
Dec. 30, 2011    (EP) .................................... 11425314

(51) Int. Cl.
*B64C 1/40*    (2006.01)
*B64C 1/06*    (2006.01)
(Continued)

(52) U.S. Cl.
CPC .................. *B64C 1/40* (2013.01); *B32B 3/12* (2013.01); *B32B 3/266* (2013.01); *B32B 5/18* (2013.01);
(Continued)

(58) Field of Classification Search
CPC ...... G10K 11/172; G10K 11/168; B32B 3/12; B32B 2307/102; B32B 2605/18;
(Continued)

(56) References Cited

U.S. PATENT DOCUMENTS 3,166,149 A * 1/1965 Hulse .................. E04B 1/86
181/292
3,211,253 A * 10/1965 Gonzalez .................. E04B 1/86
181/292

(Continued)

FOREIGN PATENT DOCUMENTS

| DE | 37 20 371 | 1/1989 |
| DE | 198 55 556 | 6/2000 |
| EP | 0 935 235 | 8/1999 |

*Primary Examiner* — Justin Rephann
(74) *Attorney, Agent, or Firm* — Leason Ellis LLP

(57) ABSTRACT

A trim panel for the interior of an aircraft, the panel having a multilayer structure and including an outer layer made of material impervious to air, and which is positioned in use facing the fuselage of the aircraft; an inner layer made of trim material, and which in use defines the interior; a structural layer interposed between the inner and outer layer; and acoustic energy dissipating material, also interposed between the inner and outer layer; the inner layer being made of porous material allowing airflow towards the acoustic energy dissipating material.

4 Claims, 2 Drawing Sheets

(51) Int. Cl.
    *B32B 5/18* (2006.01)
    *B32B 5/24* (2006.01)
    *B32B 9/02* (2006.01)
    *B32B 9/04* (2006.01)
    *B32B 3/12* (2006.01)
    *B32B 3/26* (2006.01)
    *G10K 11/168* (2006.01)
    *G10K 11/172* (2006.01)

(52) U.S. Cl.
    CPC .............. *B32B 5/245* (2013.01); *B32B 9/025* (2013.01); *B32B 9/046* (2013.01); *B64C 1/066* (2013.01); *B32B 2260/021* (2013.01); *B32B 2260/046* (2013.01); *B32B 2266/06* (2013.01); *B32B 2307/102* (2013.01); *B32B 2307/56* (2013.01); *B32B 2307/724* (2013.01); *B32B 2307/7242* (2013.01); *B32B 2605/003* (2013.01); *B32B 2605/18* (2013.01); *G10K 11/168* (2013.01); *G10K 11/172* (2013.01)

(58) Field of Classification Search
    CPC ..... Y10T 428/24149; Y10T 428/24165; E04B 1/84; E04B 1/8409; E04B 2001/8428
    USPC .......................................... 181/290, 288, 292
    See application file for complete search history.

(56) References Cited

U.S. PATENT DOCUMENTS

| | | | | |
|---|---|---|---|---|
| 3,622,430 A * | 11/1971 | Jurisich | .................... | E04C 2/32 244/117 R |
| 3,770,560 A * | 11/1973 | Elder | .................... | E01F 8/0076 181/286 |
| 3,822,762 A | 7/1974 | Crispin et al. | | |
| 4,294,329 A * | 10/1981 | Rose | .................... | B32B 3/12 181/222 |
| 4,496,024 A * | 1/1985 | Wolf | .................... | E04B 1/86 156/290 |
| 4,849,276 A * | 7/1989 | Bendig | .................... | B32B 3/12 181/292 |
| 5,000,998 A * | 3/1991 | Bendig | .................... | B32B 3/12 156/153 |
| 5,414,232 A * | 5/1995 | Wilson | .................... | B32B 3/12 181/210 |
| 5,445,861 A * | 8/1995 | Newton | .................... | B32B 3/12 181/290 |
| 5,604,010 A * | 2/1997 | Hartz | .................... | B32B 3/12 156/327 |
| 5,997,985 A * | 12/1999 | Clarke | .................... | B32B 3/12 181/286 |
| 6,065,717 A * | 5/2000 | Boock | .................... | B64C 1/066 181/287 |
| 6,176,964 B1 * | 1/2001 | Parente | ................ | G10K 11/172 156/306.9 |
| 6,179,086 B1 * | 1/2001 | Bansemir | ............. | G10K 11/172 181/198 |
| 6,220,388 B1 * | 4/2001 | Sanborn | .................... | E04B 1/86 181/290 |
| 6,371,242 B1 * | 4/2002 | Wilson | .................... | B32B 3/12 181/210 |
| 6,772,857 B2 * | 8/2004 | Porte | .................... | F02C 7/045 181/210 |
| 7,743,884 B2 * | 6/2010 | Thomas | .................... | B64C 1/40 181/292 |
| 7,854,298 B2 * | 12/2010 | Ayle | .................... | F02C 7/045 181/288 |
| 8,070,994 B2 * | 12/2011 | Carlson | ............... | B29C 44/1228 264/46.5 |
| 8,079,443 B2 * | 12/2011 | Keller | .................... | B64C 1/066 181/292 |
| 8,336,804 B2 * | 12/2012 | Hoetzeldt | .................... | 181/288 |
| 8,499,887 B2 * | 8/2013 | Gleine | ................ | B60R 13/0815 181/292 |
| 8,590,670 B1 * | 11/2013 | Grube | .................... | E04F 15/182 181/286 |
| 8,869,933 B1 * | 10/2014 | McKnight | ............ | G10K 11/172 181/207 |
| 2003/0057017 A1 * | 3/2003 | Dussac | .................... | B64C 1/40 181/290 |
| 2007/0102239 A1 * | 5/2007 | Liguore | .................... | B32B 3/12 181/292 |
| 2007/0292658 A1 * | 12/2007 | Thomas | .................... | B32B 3/10 428/116 |
| 2008/0135327 A1 * | 6/2008 | Matsumura | .......... | B61D 17/185 181/151 |
| 2009/0045009 A1 * | 2/2009 | Chiou | .................... | G10K 11/168 181/290 |
| 2009/0173571 A1 | 7/2009 | Keller | | |
| 2009/0184200 A1 | 7/2009 | Lin et al. | | |
| 2009/0246502 A1 * | 10/2009 | Hoetzeldt | ................ | B32B 5/26 428/304.4 |
| 2009/0250293 A1 | 10/2009 | Gleine et al. | | |
| 2010/0148001 A1 * | 6/2010 | Hoetzeldt | ................ | B32B 3/08 244/1 N |
| 2010/0252677 A1 * | 10/2010 | Petitjean | .................... | B64C 1/40 244/1 N |
| 2011/0006159 A1 * | 1/2011 | Herrmann | ............... | B64C 1/066 244/119 |
| 2011/0186380 A1 * | 8/2011 | Beauvilain | .............. | B60R 13/08 181/292 |
| 2011/0248117 A1 * | 10/2011 | Boock | .................... | B32B 3/12 244/1 N |
| 2011/0284689 A1 * | 11/2011 | Thomas | ................. | B64C 1/066 244/1 N |

\* cited by examiner

AIRCRAFT INTERIOR TRIM PANEL, AND AIRCRAFT FITTED WITH SUCH PANELS

CROSS REFERENCE TO RELATED APPLICATIONS

The present application is a U.S. National Phase of International Patent Application PCT/IB2012/055523, filed Oct. 11, 2012, which claims priority to European Patent Application No. 11425314.9, filed Dec. 30, 2011, each of which is incorporated herein by reference in its entirety.

TECHNICAL FIELD

The present invention relates to an aircraft interior trim panel, and more specifically to a sound-absorbing trim panel for reducing the noise level inside the aircraft.

The present invention may be used to advantage, though not exclusively, in aircraft capable of hovering, such as helicopters—to which the following description refers purely by way of a non-limiting example—or convertiplanes.

The present invention also relates to an aircraft fitted with such interior trim panels.

BACKGROUND ART

As is known, in the aircraft industry, reducing the noise level inside the cabin is now a major design issue.

Outside noise normally comes from the engines, the moving parts associated with the component parts of the aircraft, and from airflow over the airframe, and propagates from the fuselage to the interior of the aircraft mainly along air and structural paths, i.e. through structural connecting points between the fuselage and the inner fuselage panels.

Most aircraft, and particularly helicopters, are built about a supporting frame. More specifically, an outer covering is applied to the frame; thermal and acoustic insulating material is applied between the frame and the cabin; and the frame and insulating material are covered with trim panels on the side facing inwards of the cabin.

Soundproofing inside the cabin thus depends on the trim panels, the type of acoustic insulating material used, and the cabin furnishings (seats, carpeting, etc.).

Number 1 in the exploded cross section in FIG. 1 indicates as a whole one example of a known trim panel, which has a multilayer structure and substantially comprises:

- an outer layer 2 positioned in use facing the fuselage and made of composite material of carbon or glass fibres impregnated with epoxy resin;
- a honeycomb structural layer 3 positioned contacting layer 2 and made of composite material containing, for example, metha-aramide (trade name) NOMEX® fibres;
- an intermediate layer 4 with the same composition as layer 2 and positioned contacting layer 3, on the opposite side to layer 2;
- a trim layer 5 defining the side of panel 1 facing inwards of the cabin and typically made of leather; and
- a layer 6 of porous, acoustic energy dissipating material, typically closed-call, soft-touch foam, interposed between layers 4 and 5.

Known panels with the above structure have the drawback of fully reflecting soundwaves on both sides, i.e. also on the side facing inwards of the cabin, which is normally impervious to air, so that any acoustic energy propagating inside the cabin cannot be dissipated.

DISCLOSURE OF INVENTION

It is an object of the present invention to provide a simple, low-cost aircraft interior trim panel designed to eliminate the above drawback of known panels.

According to the present invention, there is provided a trim panel for the interior of an aircraft, as claimed in claim 1.

The present invention also relates to an aircraft having an interior defined by trim panels as claimed in any one of claims 1 to 7.

BRIEF DESCRIPTION OF THE DRAWINGS

A preferred, non-limiting embodiment of the present invention will be described by way of example with reference to the attached drawings, in which.

BEST MODE FOR CARRYING OUT THE INVENTION

Figure 2:
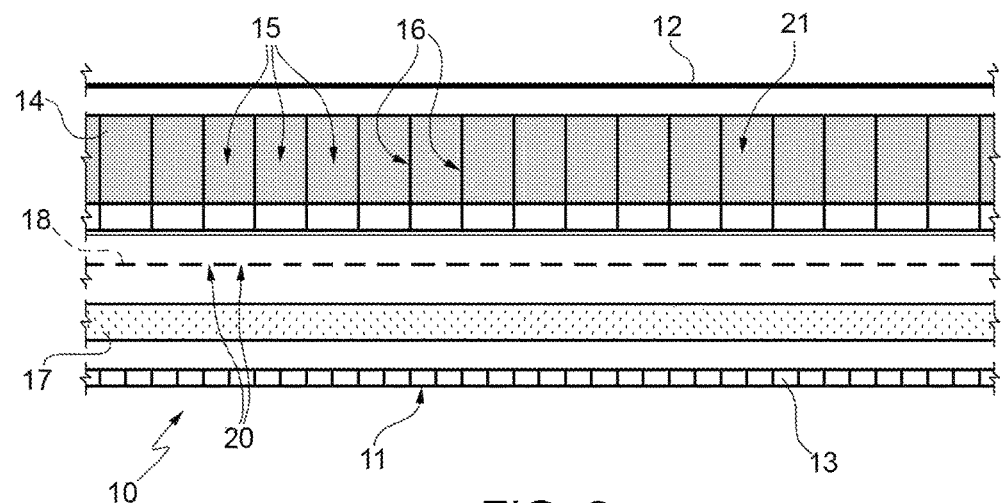
FIG. 2 shows an exploded cross section of an aircraft interior trim panel in accordance with the present invention.
Figure 3:
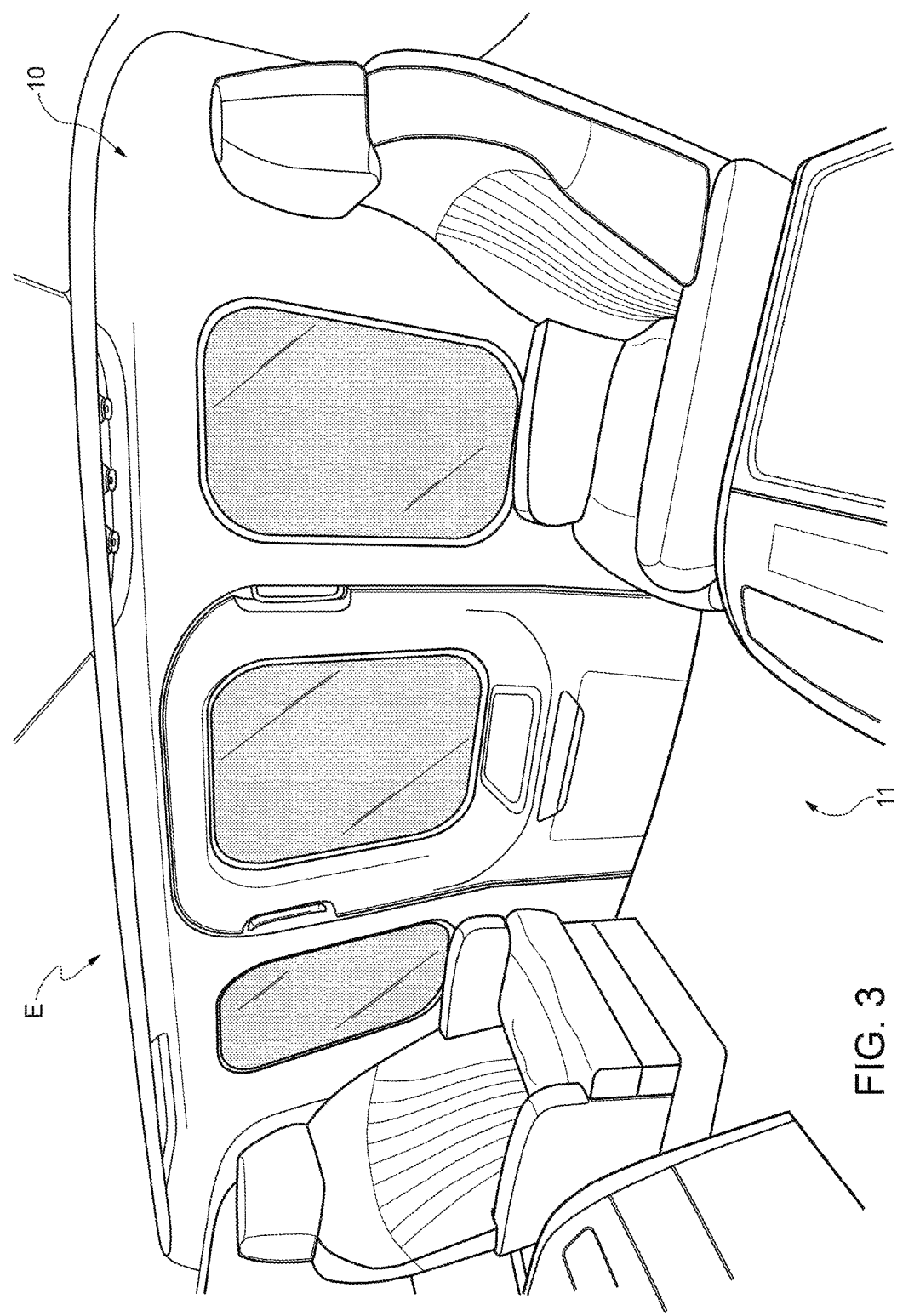
FIG. 3 shows a view in perspective of a helicopter cabin fitted with trim panels as shown in FIG. 2.

Number 10 in FIG. 2 indicates as a whole an aircraft interior trim panel in accordance with the present invention and, in the example shown, for the cabin 11 (FIG. 3) of a helicopter E.

Panel 10 has multilayer structure, and substantially comprises an outer layer 12 made of material impervious to air, and which is positioned in use facing the fuselage of the helicopter; an inner layer 13 made of trim material and defining in use the interior of cabin 11; and a honeycomb structural layer 14 interposed between outer layer 12 and inner layer 13 and comprising a number of adjacent cells 15 defining respective air passages 16.

Panel 10 also comprises a layer 17 made of acoustic energy dissipating material and interposed between structural layer 14 and inner layer 13; and a further layer 18 interposed between layers 14 and 17.

Figure 1:
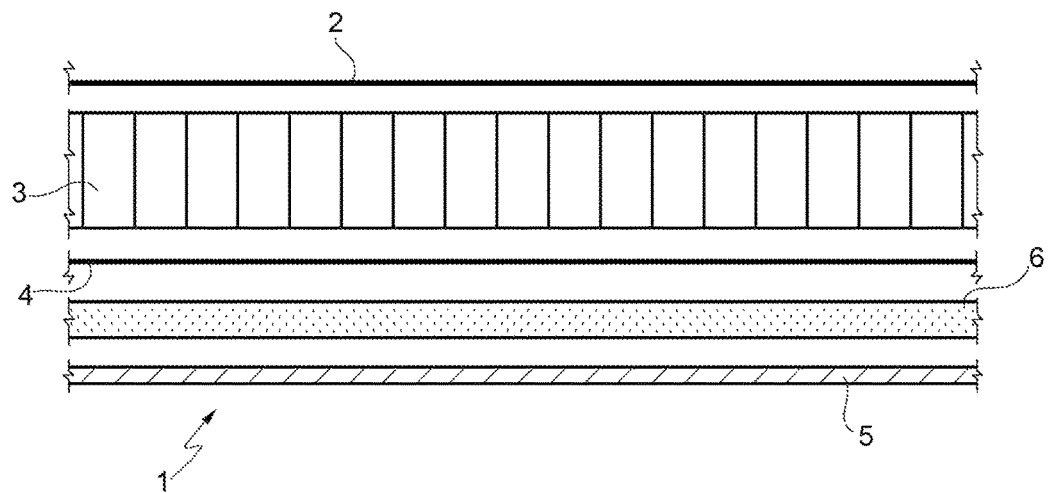
FIG. 1 shows a cross section of a known aircraft interior trim panel.

In the example shown, outer layer 12 is made of composite material of carbon or glass fibres impregnated with epoxy resin, and is identical to layer 2 of the known panel 1 in FIG. 1, except that it has a larger number of composite material layers for better airflow insulation.

Inner layer 13 is made of porous material allowing airflow inwards of panel 10, such as, for example, perforated or porous leather, or porous fabrics.

Advantageously, cells 15 of structural layer 14 are only partly filled with acoustic energy dissipating material 21, such as foam; in this way, as shown in FIG. 2, an air gap is provided in each cell 15 of layer 14 between the acoustic energy dissipating material 21 and layers 17 and 18.

Preferably, the acoustic energy dissipating material 21 fills each cell 15 two thirds full.

Layer 14 may be made of the same material as structural layer 3 of the known panel 1 in FIG. 1, i.e. a composite material of metha-aramide (trade name NOMEX®) fibres.

Layer 18 is preferably made of the same material as outer layer 12, but with through openings 20, and may, for example, be in the form of a grid.

In the example shown, layer 17 is made of open-cell foam.

Panel 10 is formed by placing layers 12, 13 14, 17 and 18 one on top of another as shown in FIG. 2, and vacuum compacting the resulting assembly in an autoclave. The resin thus acts as adhesive to bond layers 12, 13, 14, 17, 18 together.

The advantages of panel 10 according to the teachings of the present invention will be clear from the above description.

In particular, layers 13, 17, 18 and 14 allow soundwaves from inside cabin 11 to propagate freely through panel 10, thus dissipating the acoustic energy associated with them and greatly improving the capacity of panel 10 to absorb noise from inside cabin 11.

Moreover, the improvement in the noise-absorbing capacity of panel 10 is achieved with no increase in the thickness of panel 10 with respect to known panels, of which panel 1 in FIG. 1 is a typical example.

The applicant has experimentally noted that the air gap provided in each cell 15 of layer 14 between the acoustic energy dissipating material 21 and layers 17 and 18 allows to noticeably increase the damping and sound-adsorbent effects with respect to the known solutions.

Clearly, changes may be made to panel 10 as described and illustrated herein without, however, departing from the protective scope of the accompanying Claims.

The invention claimed is:

1. A trim panel (10) for the interior (11) of an aircraft (E), the panel having a multilayer structure and comprising:
    an outer layer (12) made of material impervious to air, and which is positioned in use facing the fuselage of said aircraft (E);
    an inner layer (13) made of trim material, and which in use defines said interior (11);
    a structural layer (14) interposed between said inner and outer layer (13, 12) and comprising a number of adjacent cells (15) defining respective air passages (16); and
    acoustic energy dissipating material (17, 21), also interposed between said inner (13) and outer (12) layer;
    said inner layer (13) being made of porous material allowing airflow towards said acoustic energy dissipating material (17, 21);
    characterized in that said cells (15) are partly filled with said acoustic energy dissipating material (21), wherein said acoustic energy dissipating material forms a further layer (17) interposed between said structural layer (14) and said inner layer (13), wherein an air gap is provided in each of said cells (15) of said structural layer (14) between said further layer (17) and said acoustic energy dissipating material (21) located in said cells (15), and wherein said panel comprises, between said structural layer (14) and said further layer (17), an intermediate layer (18), which is made of the same material as said outer layer (12) and is in the form of a grille with through openings (20), wherein said acoustic energy dissipating material (17, 21) is foam.

2. A panel as claimed in claim 1, wherein said acoustic energy dissipating material (21) fills each of said cells (15) two thirds full.

3. A panel as claimed in claim 1, wherein said further layer (17) is made of open-cell foam.

4. An aircraft comprising:
    an interior (11) defined by at least one trim panel (10), wherein the trim panel has a multilayer structure comprising:
    an outer layer (12) made of material impervious to air, and which is positioned in use facing the fuselage of said aircraft (E);
    an inner layer (13) made of trim material, and which in use defines said interior (11);
    a structural layer (14) interposed between said inner and outer layer (13, 12) and comprising a number of adjacent cells (15) defining respective air passages (16); and
    acoustic energy dissipating material (17, 21), also interposed between said inner (13) and outer (12) layer;
    said inner layer (13) being made of porous material allowing airflow towards said acoustic energy dissipating material (17, 21);
    characterized in that said cells (15) are partly filled with said acoustic energy dissipating material (21), wherein said acoustic energy dissipating material forms a further layer (17) interposed between said structural layer (14) and said inner layer (13), wherein an air gap is provided in each of said cells (15) of said structural layer (14) between said further layer (17) and said acoustic energy dissipating material (21) located in said cells (15), and wherein said panel comprises, between said structural layer (14) and said further layer (17), an intermediate layer (18), which is made of the same material as said outer layer (12) and is in the form of a grille with through openings (20), wherein said acoustic energy dissipating material (17, 21) is foam.

* * * * *